(12) United States Patent
Morozov et al.

(10) Patent No.: US 11,212,372 B2
(45) Date of Patent: Dec. 28, 2021

(54) ENHANCED MULTI TRANSPORT FOR REDUNDANCY

(71) Applicant: Ooma, Inc., Sunnyvale, CA (US)

(72) Inventors: Vyacheslav Morozov, Moscow (RU);
Arvind Vasudev, Sunnyvale, CA (US);
William M. Gillon, San Mateo, CA (US); Egor Zyryanov, Moscow (RU);
Daniel Furse, Menlo Park, CA (US);
Tobin E. Farrand, Pacific Grove, CA (US); Amir Shalit, Tracy, CA (US);
Dean Nishikida, Sunnyvale, CA (US);
Suhas Joshi, Belmont, CA (US)

(73) Assignee: Ooma, Inc., Sunnyvale, CA (US)

(*) Notice: Subject to any disclaimer, the term of this patent is extended or adjusted under 35 U.S.C. 154(b) by 0 days.

(21) Appl. No.: 16/731,934

(22) Filed: Dec. 31, 2019

(65) Prior Publication Data
US 2021/0203759 A1 Jul. 1, 2021

(51) Int. Cl.
*H04L 29/06* (2006.01)
*H04L 29/08* (2006.01)
*H04L 12/707* (2013.01)
*H04Q 11/04* (2006.01)

(52) U.S. Cl.
CPC ........ *H04L 69/14* (2013.01); *H04L 29/06027* (2013.01); *H04L 45/24* (2013.01); *H04L 67/02* (2013.01); *H04L 67/322* (2013.01); *H04L 67/42* (2013.01); *H04L 69/329* (2013.01); *H04Q 11/0478* (2013.01)

(58) Field of Classification Search
CPC ....... H04L 67/02; H04L 67/42; H04L 67/322; H04L 67/329; H04L 45/24
See application file for complete search history.

(56) References Cited

U.S. PATENT DOCUMENTS

| | | | |
|---|---|---|---|
| 10,939,231 B2 | 3/2021 | Gharachedaghi et al. | |
| 2008/0021714 A1* | 1/2008 | Kraez | G06Q 10/0833 705/34 |
| 2009/0161610 A1* | 6/2009 | Kang | H04B 1/715 370/329 |
| 2010/0150150 A1* | 6/2010 | Paz | H04L 47/10 370/389 |
| 2011/0250875 A1 | 10/2011 | Huang et al. | |
| 2013/0177023 A1* | 7/2013 | Salinger | H04L 69/08 370/401 |
| 2015/0264447 A1* | 9/2015 | Brooks | H04N 21/64322 725/31 |
| 2017/0034044 A1* | 2/2017 | Gillon | H04L 43/0829 |
| 2017/0155590 A1* | 6/2017 | Dillon | H04L 41/5025 |
| 2020/0099768 A1* | 3/2020 | Zeng | G06F 3/0484 |
| 2020/0413215 A1 | 12/2020 | Gharachedaghi et al. | |

* cited by examiner

*Primary Examiner* — Yves Dalencourt
(74) *Attorney, Agent, or Firm* — Carr & Ferrell LLP

(57) ABSTRACT

Methods and systems for enhanced multipath transport (MPT) are provided. Exemplary methods include: receiving by a hub a first data packet from a client; identifying a priority of the first data packet; encapsulating the first data packet based on the priority; redundantly sending a first encapsulated first data packet to an MPT server over a wired broadband network and a second encapsulated first data packet to the MPT server over a wireless broadband network; getting a second data packet responsive to the first encapsulated data packet, the second data packet being produced by a service; forwarding the second data packet to the client.

8 Claims, 5 Drawing Sheets

ENHANCED MULTI TRANSPORT FOR REDUNDANCY

FIELD OF THE INVENTION

The present technology pertains to telecommunications, and more specifically to data network communications.

BACKGROUND ART

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Broadband communication is wide bandwidth data transmission which transports multiple signals and traffic types. The medium can be coaxial cable, optical fiber, radio, or twisted pair. A network outage is the loss of network resources.

SUMMARY OF THE INVENTION

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to various methods and systems for determining a geofence has been crossed. Specifically, a method for enhanced multipath transport (MPT) may comprise: receiving by a hub a first data packet from a client; identifying a priority of the first data packet; encapsulating the first data packet based on the priority; redundantly sending a first encapsulated first data packet to an MPT server over a wired broadband network and a second encapsulated first data packet to the MPT server over a wireless broadband network, wherein the first encapsulated first data packet includes a MPT protocol header having a tunnel id field that identifies packets of a MPT channel among other incoming packets, the tunnel id field including a peer id that is a unique identification for a tunnel known on both sender and receiver sides of the MPT channel; getting a second data packet responsive to the first encapsulated data packet, the second data packet being produced by a service; forwarding the second data packet to the client. may comprise: configuring a plurality of services of a mobile operating system using respective application programming interfaces; receiving a wake up from the mobile operating system; getting a notification from a service of the plurality of services; confirming the geofence has been crossed; and notifying a backend that the geofence has been crossed.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
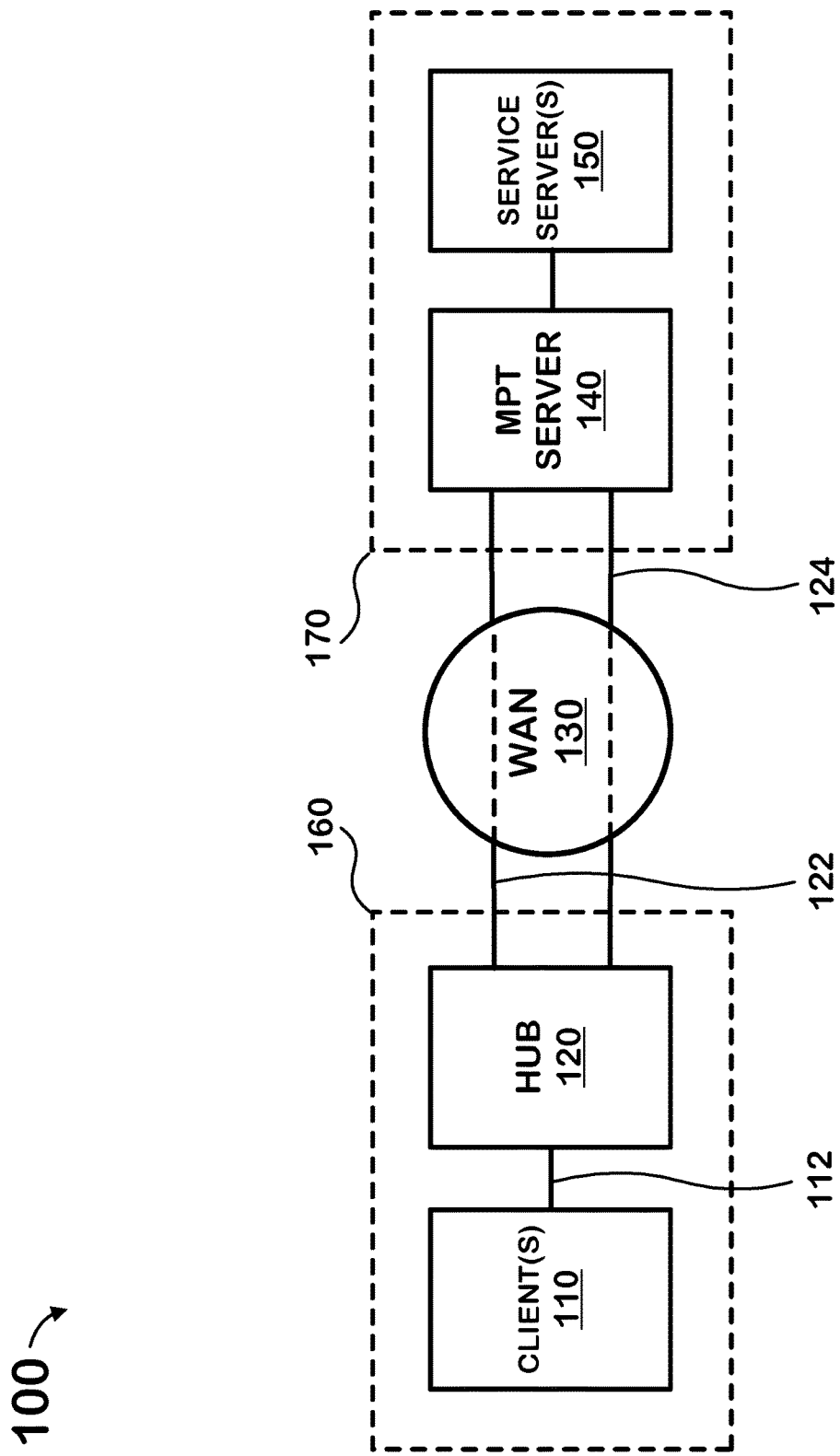
FIG. 1 is a simplified block diagram of a system for enhanced multipath transport (MPT) for redundancy, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

FIG. 1 shows system 100 for enhanced multipath transport (MPT) for redundancy, according to some embodiments. System 100 can include (MPT) client device(s) 110 (also referred to as client(s) or clients), wired and/or wireless local area network (LAN) 112, hub 120, mobile broadband 122, wired broadband 124, MPT server 140, and service server(s) 150.

Client(s) 110 an include corded and/or wireless telephones (e.g., Digital Enhanced Cordless Telecommunications (DECT) cordless telephones), point of sale (POS) terminal, (smart) television, smart phone, tablet computer, notebook computer, desktop computer, smart speaker, smart display, smart thermostat, alarm sensor (e.g., glass breakage sensor, smoke detectors, carbon monoxide detectors, flood detectors, motion detectors, door and/or window switches), and the like. Generally, telephones convert sound, typically the human voice, into electronic signals that are transmitted via cables and other communication channels to another telephone which reproduces the sound to a receiving user. A point of sale terminal (POS terminal) is an electronic device used to receive credit card payments (e.g., VISA and MASTERCARD), mobile payments (e.g., APPLE PAY and GOOGLE PAY), and the like at retail locations. Smart phone, tablet computer, notebook computer, and desktop computer are described below in relation to FIG. 5. A smart speaker can be a type of wireless speaker and voice command device with an integrated virtual assistant that offers interactive actions and hands-free activation with the help of one or more "hot words." A virtual assistant can be a software agent that performs tasks or services for an individual based on verbal commands. A smart display is a smart speaker having a display/screen which can be used to present (still and/or moving) images to a user. A smart thermostat is a thermostat that can be used with home automation and are responsible for controlling a home's heating and/or air conditioning.

In various embodiments, client device(s) 110 can run a client application which uses a service provisioned by service server(s) 150. Additionally or alternatively, client device(s) 110 can run a general-purpose application, such as a web browser, to access a service provisioned by service server(s) 150. By way of non-limiting example, service can be voice/audio communications (telephony), video conferencing, fax communications, video streaming, security system monitoring, and the like.

Wired and/or wireless LAN 112 is a wired and/or wireless network on premises 160. Premises 160 can be a home office, small office, retail store, restaurant, and the like. Wired and/or wireless LAN 112 can be used for communications between client(s) 110 and hub 120. Wired and/or wireless LAN 112 can include Ethernet, Wi-Fi, Bluetooth, and the like.

Hub 120 can include a router, Wi-Fi radio, modem for wired broadband service, radio for mobile broadband, and the like. Hub 120 can include at least some of a computing device as described below in relation to FIG. 5. Hub 120 communicates over a wide area network (WAN) 130, such as the Internet, through mobile broadband 122 and wired broadband 124. Mobile broadband 122 can include wireless Internet access, such as services using 3G, 4G, 5G, etc. wireless mobile telecommunications technology. By way of non-limiting example, mobile broadband 122 can be provisioned by such companies at SPRINT, VERIZON WIRELESS, T-Mobile, AT&T, and the like. Wired broadband 124 can be cable Internet access, digital subscriber line (DSL), fiber to the premises (FTTP), and the like. By way of further non-limiting example, wired broadband 124 can be provisioned by such companies as AT&T, XFINITY, GOOGLE and the like. Although each of mobile broadband 122 and wired broadband 124 is depicted as one line, hub 120 can accommodate more than one mobile broadband 122 and/or wired broadband 124, according to some embodiments. Alternatively or additionally, various combinations of (different numbers of) mobile broadband 122 and wired broadband 124 can be used.

While hub 120 is depicted by a single block, hub 120 can include more than one physical enclosure (case). For example, hub 120 can include a computing device, Ethernet port, and wired and wireless LAN hardware in one enclosure, and a mobile broadband radio in another enclosure. Different combinations and permutations of hub 120 hardware can be in one or more different enclosures. Hub 120 can be physically located on premises 160. Although one premises 160 is depicted in FIG. 1, system 100 can include more than one instance of premises 160.

According to some embodiments, hub 120 can receive communications from (MPT) client(s) 110, encapsulate them, and then redundantly send them over both mobile broadband 122 and wired broadband 124 to MPT server 140. While wired broadband 124 is generally less expensive for sending communications traffic (e.g., data packets), it can be unreliable. For example, portions of WAN 130 go down due to adverse weather conditions, such as snow and lightning. By way of further example, portions of WAN 130 drop packets or have high latency, due to network congestion, misconfigured equipment, and the like.

Some applications/services can be important enough to a home or business to warrant the higher cost of redundantly sending data over both mobile broadband 122 and wired broadband 124. For example, voice communications and alarm monitoring can be such applications/services. Point of Sale service (e.g., payment processing) at a retail store and video streaming at a sports bar (e.g., of a major sporting event) are further examples.

Hub 120 can selectively send packets using enhanced multi transport. For example, particular applications/services (e.g., voice/audio communications, alarm monitoring, and the like) can be predetermined to use enhanced multi transport. When hub 120 receives data packets from the predetermined applications on client(s) 110, the data packets can be sent redundantly. Alternatively or additionally, when hub 120 receives data packets addressed to a particular Internet protocol (IP) address (or predefined range of IP addresses) associated with the predetermined application/service, the data packets can be sent redundantly.

Communications between hub 120 and Multipath transport (MPT) server 140 can be encapsulated, such that the link(s) between hub 120 and MPT server 140 can be referred to as tunnel(s). In some embodiments, a tunneling protocol is used to encapsulate different network layer protocols inside virtual point-to-point links or point-to-multipoint links over an Internet Protocol network. By way of non-limiting example,) GRE-in-UDP encapsulation for tunneling network protocol packets across an IP network based on Generic Routing Encapsulation (GRE) and User Datagram Protocol (UDP) headers can be adapted for IPv4 and IPv6 networks. Here, the GRE header indicates the payload protocol type via an EtherType in the protocol type field.

Data center 170 can be a facility that houses computing facilities like servers, routers, switches and firewalls, as well as supporting components like backup equipment, fire suppression facilities, and air conditioning. Data center 170 can be operated by the provider of the predetermined application/service, for example, to provision the service. While depicted as a single entity, data center 170 can be spread across one or many physical locations. At least some of the computing facilities in data center 170 can comprise a cloud computing environment, descripted further in relation to FIG. 5. According to some embodiments, data center can include multipath transport (MPT) server 140 and service server(s) 150.

Multipath transport (MPT) server 140 can receive encapsulated traffic redundantly sent from hub 120, decapsulate it, optionally recover the original traffic from the redundant streams (sent over mobile broadband 122 and wired broadband 124).

Embodiments of the present invention can include an additional multipath transport (MPT) channel header for multiplexing client(s) 110 onto multiple instances of MPT server 140. For example, the additional MPT channel header can be 64-bits and include a tunnel_id field, flags, and sub-flow (path) identification (ID). Flags can signal to the destination side that a MPT tunnel uses de-duplication and/or packet re-ordering. The subflow (path) ID can be the ID of the path. It can be used by the receiving side to detect current parameters of the MPT tunnel, such as the number of active sub-flows.

The tunnel_id field identifies packets of given MPT channel among other incoming packets. Between client and server there can be multiple MPT channels with different properties (type of service). Each MPT channel has mpt_sequence counter and set of used sub-flow. The tunnel_id field can include peer_id and type_of_service parts. The peer_id is a unique identification for a particular tunnel, which is known on both sides of an MPT channel (sender and receiver). For example, it can be MAC address (part of it) of a network interface of hub 120. MPT server 140 can also provide the peer_id when sending data. In various embodiments, the peer_id of MPT server 140 can be its public IP address or a fixed ID (e.g., all 1s). The type_of_service part identifies which type of service has been provided by the sender and should be applied for given channel by receiver. For example, type_of_service can identify which additional features like deduplication, packet-reordering, etc. are in use. In addition, the type_of_service part can provide Quality of Service (QoS) requirements for low-level transport for given channel, like traffic priority.channel, like traffic priority.

Figure 2:
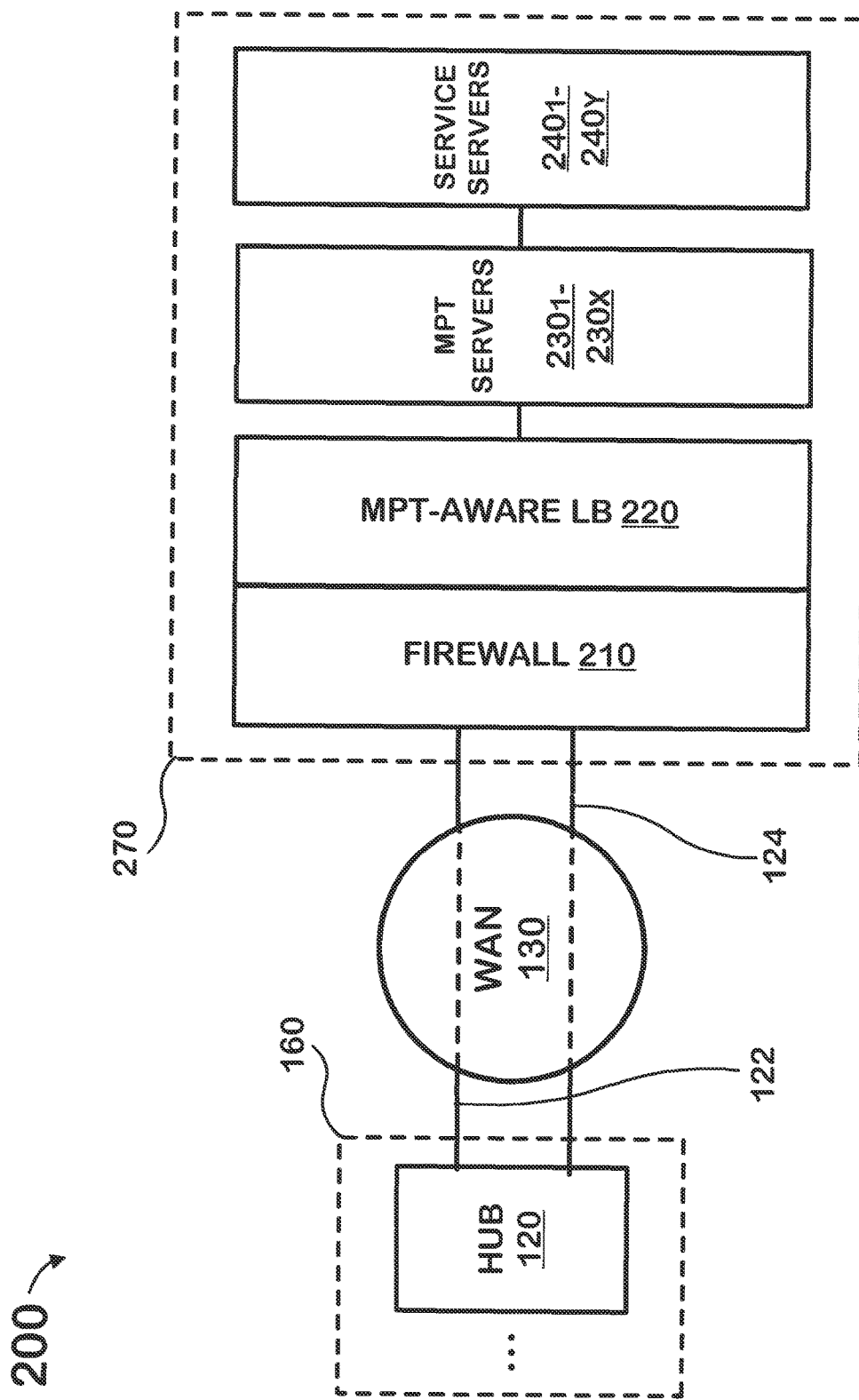
FIG. 2 is a simplified block diagram of a system for load balancing in enhanced multipath transport (MPT) for redundancy, according to various embodiments.

FIG. 2 illustrates system 200 for load balancing in enhanced multipath transport (MPT) for redundancy, according to some embodiments. FIG. 2 includes hub 120 in premises 160, wide area network (WAN) 130 (e.g., the Internet), and data center 270. Hub 120, premises 160, WAN 130, and data center 270 have at least some of the characteristics of hub 120, premises 160, WAN 130, and data center 270 (respectively), as described in relation to FIG. 1. Data center 270 further comprises firewall 210, MPT-aware load balancer 220, MPT servers $230_1$-$230_X$, and service servers $240_1$-$240_Y$. MPT servers $230_1$-$230_X$ and service servers $240_1$-$240_Y$ have at least some of the characteristics of MPT server 140 and service server(s) 150 described above in relation to FIG. 1.

Firewall 210 can monitor and control incoming and outgoing network traffic based on predetermined security rules. Firewall 210 can also perform Network Address Translation (NAT), which maps one IP address space into another by modifying network address information in the IP header of packets while they are in transit. MPT-aware load balancer 220 handles traffic from (MPT) clients 110 (FIG. 1) to service servers $240_1$-$240_Y$. For example, MPT-aware load balancer 220 can use 64-bit hash of the MPT-channel-header to direct the traffic from any (MPT) client 110 to the same MPT server of MPT servers $230_1$-$230_X$, which can ensure that the traffic continues to flow to the same MPT server. If the MPT server fails, then MPT-aware load balancer 220 can detect the failure and redirect traffic to another MPT-server of MPT servers $230_1$-$230_X$ on an active server list. To determine whether an MPT-server of MPT servers $230_1$-$230_X$ is active, MPT-aware load balancer 220 can use an application-ping-pong message. Advantageously, since the traffic is being sent over User Datagram Protocol (UDP), the failover can continue the session, without interruption of the service, once the traffic has failed over to the other MPT server of MPT servers $230_1$-$230_X$.

Figure 3:
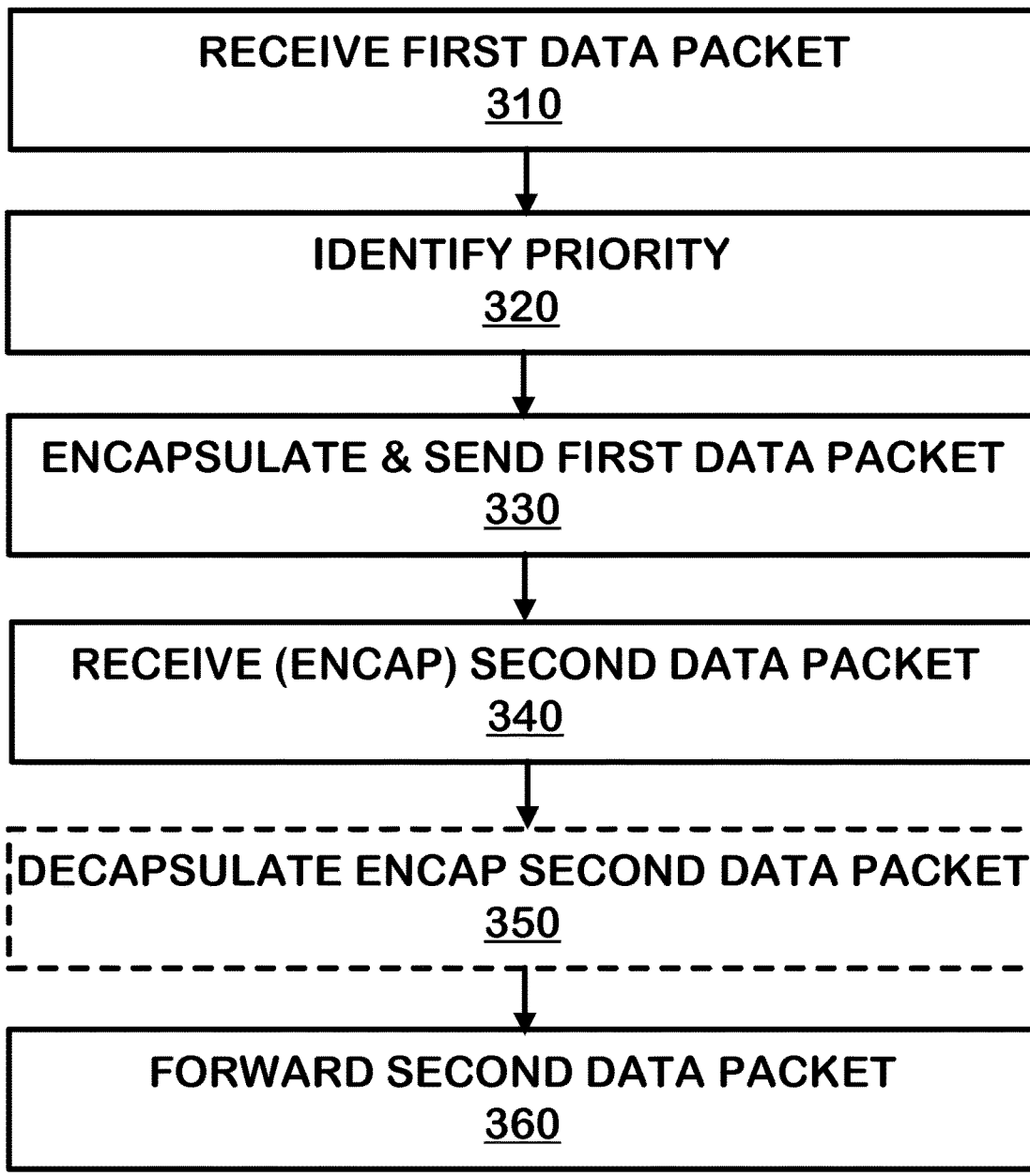
FIG. 3 is a simplified flow diagram of a method for enhanced multipath transport (MPT) for redundancy, in accordance with some embodiments.

FIG. 3 shows method 300 for client-side redundancy and duplication using enhanced multipath transport (MPT), according to some embodiments. Method 300 can be performed by hub 120 in FIGS. 1 and 2. Method 300 can commence at step 310 where a first data packet is received from an (MPT) client. For example, hub 120 receives a first data packet from (MPT) client 110 over wired and/or wireless LAN 112 (FIG. 1).

At step 320, the first packet is identified as coming from a (predetermined) priority application (or for a priority service). For example, the application which originates the packet and/or the IP address to which the packet is directed can be used to determine whether the packet should be redundantly sent to MPT server 140 (FIG. 1) and/or one of MPT servers $230_1$-$230_X$ (FIG. 2).

At step 330, the first packet is encapsulated twice to create two tunnels/channels and sent. For example, the first packet is redundantly sent over can be sent to MPT server 140 (FIG. 1) and/or one of MPT servers $230_1$-$230_X$ (FIG. 2) through both mobile broadband 122 and wired broadband 124 (FIG. 1).

At step 340, a second encapsulated packet is received. For example, a second encapsulated packet can be received from MPT server 140 (FIG. 1) and/or one of MPT servers $230_1$-$230_X$ (FIG. 2). The second encapsulated packet can be responsive to the first encapsulated packet. For example, the second encapsulated packet—before being encapsulated by MPT server 140 and/or one of MPT servers $230_1$-$230_X$—is produced by service server(s) 150 (FIG. 1) and/or one of service servers $240_1$-$240_Y$ in response to the first packet.

The second packet can be received through mobile broadband 122, wired broadband 124 (FIG. 1), or combinations thereof. For example, when wired broadband 124 is experiencing an outage or enough latency to affect the quality of service (QoS), the second packet can be sent through both mobile broadband 122 and wired broadband 124.

At step 350, the encapsulated second packet can be optionally decapsulated. In addition, the decapsulated packet can be recovered when it is sent over multiple tunnels/channels (e.g., both mobile broadband 122 and wired broadband 124).

At step 360, the second packet can be forwarded to the client. For example, the second data packet can be provided to client(s) 110.

Figure 4:
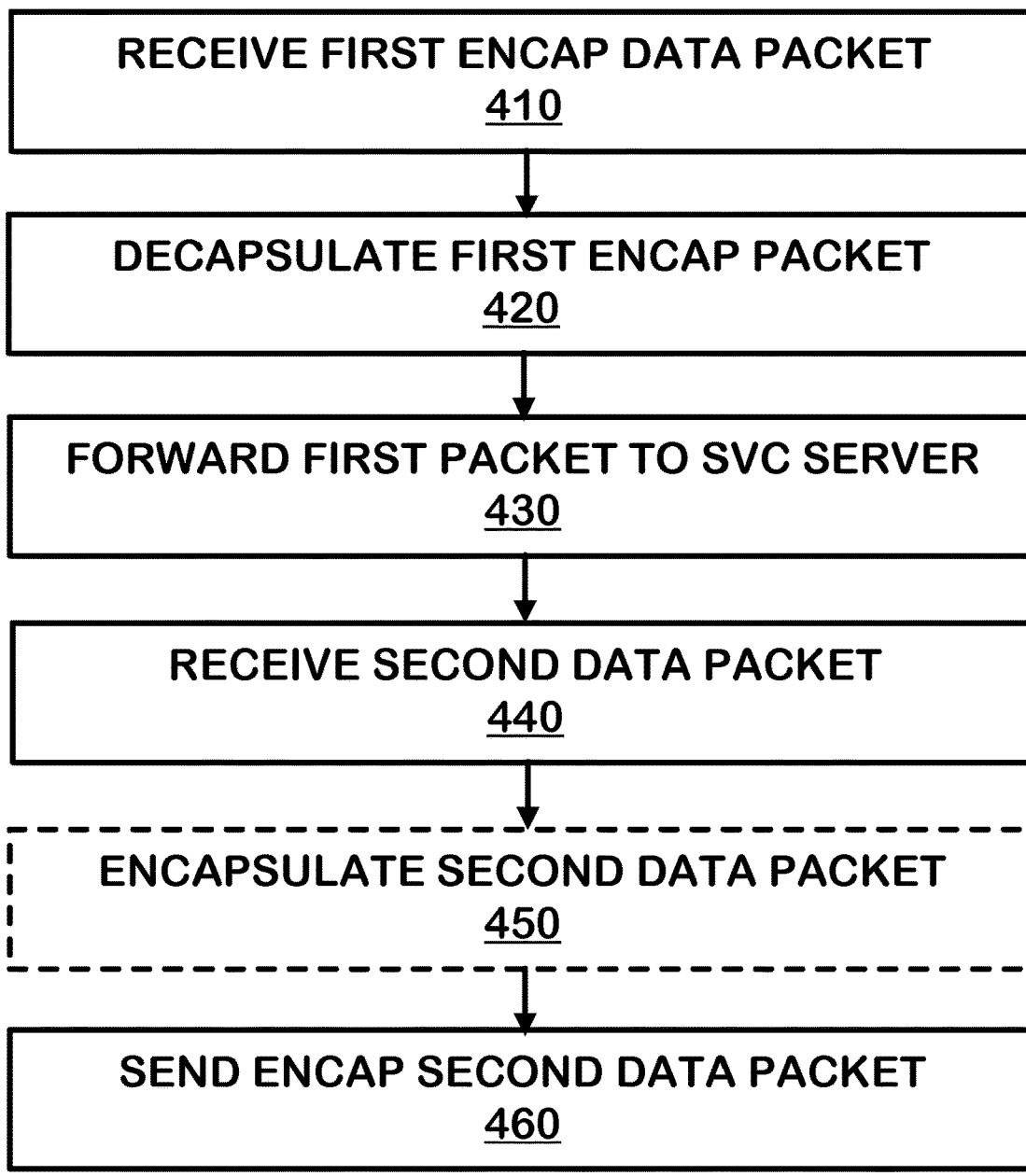
FIG. 4 is another simplified flow diagram of a method for enhanced multipath transport (MPT) for redundancy, in accordance with various embodiments.

FIG. 4 shows method 400 for server-side redundancy and duplication using enhanced multipath transport (MPT), according to some embodiments. Method 400 can be performed by service server(s) 150 (FIG. 1) and service servers $240_1$-$240_Y$. Method 400 can commence at step 410 the first encapsulated (described in FIG. 3) packet is received. For example, the first encapsulated packet was sent by hub 120 (FIGS. 1 and 2) at step 330.

At step 420, the encapsulated first packet can be decapsulated. In addition, the decapsulated first packet can be recovered when it is sent over multiple tunnels/channels (e.g., both mobile broadband 122 and wired broadband 124).

At step 430, the decapsulated first packet can be directed to a service server. For example, the decapsulated first packet can be forwarded to service server(s) 150 (FIG. 1) and/or service servers $240_1$-$240_Y$ (FIG. 2) for processing.

At step 440, a second packet is received from a service server. For example, service server(s) 150 (FIG. 1) and/or service servers $240_1$-$240_Y$ (FIG. 2) produce the second packet responsive to the first packet.

At step 450, the second packet is optionally encapsulated.

At step 460, the encapsulated second packet is sent to a hub. For example, the encapsulated second packet is sent to hub 120 (FIGS. 1 and 2) over WAN 130 (FIGS. 1 and 2). In some embodiments, the encapsulated second packet is sent through mobile broadband 122, wired broadband 124 (FIG. 1), or combinations thereof. For example, when wired broadband 124 is experiencing an outage or enough latency to affect the quality of service (QoS), the second packet can be redundantly sent through both mobile broadband 122 and wired broadband 124.

Figure 5:
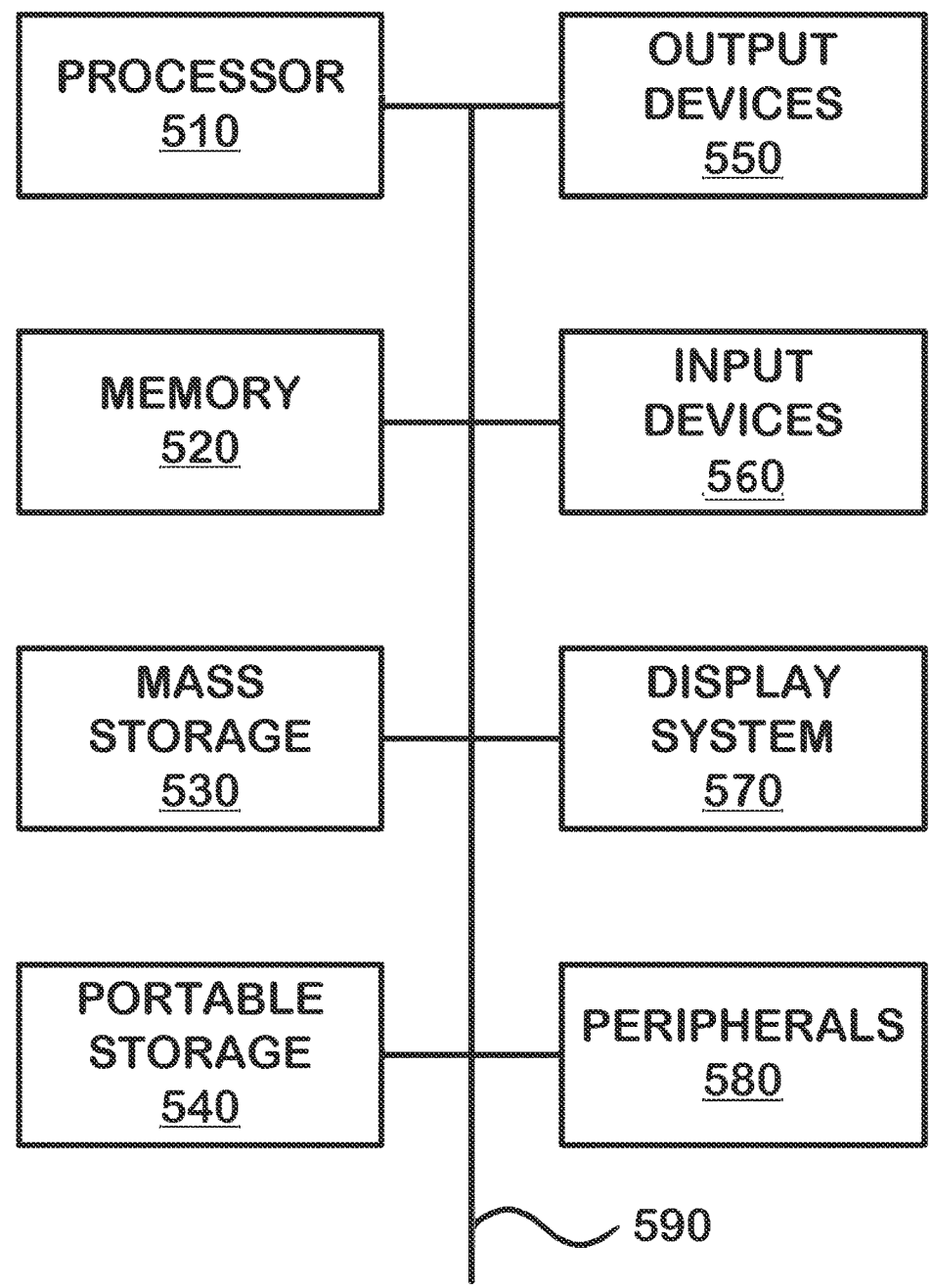
FIG. 5 is a simplified block diagram of a computing system, according to some embodiments.

FIG. 5 illustrates an exemplary computer system 500 that may be used to implement some embodiments of the present invention. The computer system 500 in FIG. 5 may be implemented in the contexts of the likes of computing systems, networks, servers, or combinations thereof. The computer system 500 in FIG. 5 includes one or more processor unit(s) 510 and main memory 520. Main memory 520 stores, in part, instructions and data for execution by processor unit(s) 510. Main memory 520 stores the executable code when in operation, in this example. The computer system 500 in FIG. 5 further includes a mass data storage 530, portable storage device 540, output devices 550, user input devices 560, a graphics display system 570, and peripheral device(s) 580.

The components shown in FIG. 5 are depicted as being connected via a single bus 590. The components may be connected through one or more data transport means. Processor unit(s) 510 and main memory 520 are connected via a local microprocessor bus, and the mass data storage 530, peripheral device(s) 580, portable storage device 540, and graphics display system 570 are connected via one or more input/output (I/O) buses.

Mass data storage 530, which can be implemented with a magnetic disk drive, solid state drive, or an optical disk drive, is a non-volatile storage device for storing data and instructions for use by processor unit(s) 510. Mass data storage 530 stores the system software for implementing embodiments of the present disclosure for purposes of loading that software into main memory 520.

Portable storage device 540 operates in conjunction with a portable non-volatile storage medium, such as a flash drive, floppy disk, compact disk, digital video disc, or Universal Serial Bus (USB) storage device, to input and output data and code to and from the computer system 500 in FIG. 5. The system software for implementing embodiments of the present disclosure is stored on such a portable medium and input to the computer system 500 via the portable storage device 540.

User input devices 560 can provide a portion of a user interface. User input devices 560 may include one or more microphones, an alphanumeric keypad, such as a keyboard, for inputting alphanumeric and other information, or a pointing device, such as a mouse, a trackball, stylus, or cursor direction keys. User input devices 560 can also include a touchscreen. Additionally, the computer system 500 as shown in FIG. 5 includes output devices 550. Suitable output devices 550 include speakers, printers, network interfaces, and monitors.

Graphics display system 570 include a liquid crystal display (LCD) or other suitable display device. Graphics display system 570 is configurable to receive textual and graphical information and processes the information for output to the display device.

Peripheral device(s) 580 may include any type of computer support device to add additional functionality to the computer system.

Some of the components provided in the computer system 500 in FIG. 5 can be those typically found in computer systems that may be suitable for use with embodiments of the present disclosure and are intended to represent a broad category of such computer components. Thus, the computer system 500 in FIG. 5 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computer system 500, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for enhanced multipath transport (MPT), the method comprising:
    receiving by a hub a first data packet from a client;
    identifying a priority of the first data packet, the priority being identified based on the first data packet, at least one predetermined application running on the client and a predetermined service requested in the first data packet;
    encapsulating the first data packet based on the priority;
    redundantly sending a first encapsulated first data packet to an MPT server over a wired broadband network and a second encapsulated first data packet to the MPT server over a wireless broadband network, wherein the first encapsulated first data packet includes a MPT protocol header having a tunnel id field that identifies packets of a MPT channel among other incoming packets, the tunnel id field including a peer id that is a unique identification for a tunnel known on both sender and receiver sides of the MPT channel;
    getting a second data packet responsive to the first encapsulated first data packet, the second data packet being produced by a service; and
    forwarding the second data packet to the client.

2. The computer-implemented method of claim 1, wherein the client runs an application associated with the service.

3. The computer-implemented method of claim 1, wherein the wired broadband network is at least one of cable Internet access, digital subscriber line (DSL), and fiber to the premises (FTTP).

4. The computer-implemented method of claim 1, wherein the hub includes a radio for the wireless broadband network.

5. The computer-implemented method of claim 1, wherein the wireless broadband network is at least one of 3G, 4G, and 5G wireless telecommunications.

6. The computer-implemented method of claim 1, wherein the hub includes a modem for the wireless broadband network.

7. The computer-implemented method of claim 1, wherein the service includes at least one of voice communications, text messaging, security system monitoring, financial services, and media streaming.

8. The computer-implemented method of claim 1, wherein the hub is physically located on premises.

\* \* \* \* \*